(12) United States Patent
Byun

(10) Patent No.: US 10,205,196 B2
(45) Date of Patent: Feb. 12, 2019

(54) SECONDARY BATTERY

(71) Applicant: SAMSUNG SDI CO., LTD., Yongin-si, Gyeonggi-do (KR)

(72) Inventor: Bohyun Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/056,963

(22) Filed: Feb. 29, 2016

(65) Prior Publication Data

US 2016/0261009 A1 Sep. 8, 2016

(30) Foreign Application Priority Data

Mar. 2, 2015 (KR) .................. 10-2015-0029079

(51) Int. Cl.
| | | |
|---|---|---|
| *H01M 10/42* | (2006.01) | |
| *H01M 2/02* | (2006.01) | |
| *H01M 2/34* | (2006.01) | |
| *H01M 10/637* | (2014.01) | |
| *H01M 2/04* | (2006.01) | |
| *H01M 2/06* | (2006.01) | |
| *H01M 2/30* | (2006.01) | |
| *H01M 10/48* | (2006.01) | |

(52) U.S. Cl.
CPC ....... *H01M 10/425* (2013.01); *H01M 2/0217* (2013.01); *H01M 2/04* (2013.01); *H01M 2/06* (2013.01); *H01M 2/30* (2013.01); *H01M 2/348* (2013.01); *H01M 10/4257* (2013.01); *H01M 10/486* (2013.01); *H01M 10/637* (2015.04); *H01M 2010/4271* (2013.01); *H01M 2200/106* (2013.01); *H01M 2220/30* (2013.01)

(58) Field of Classification Search
None
See application file for complete search history.

(56) References Cited

U.S. PATENT DOCUMENTS

| | | |
|---|---|---|
| 2007/0020509 A1 | 1/2007 | Kim |
| 2012/0070698 A1 | 3/2012 | Baek |
| 2014/0272476 A1* | 9/2014 | Park .................... H01M 2/0217 429/7 |

FOREIGN PATENT DOCUMENTS

| | | |
|---|---|---|
| EP | 2 200 113 B1 | 6/2010 |
| EP | 2 775 545 A1 | 9/2014 |
| JP | 2003-51304 A | 2/2003 |

(Continued)

OTHER PUBLICATIONS

Screenshot of https://www.merriam-webster.com/dictionary/height obtained on May 29, 2018 published in 2018.*

(Continued)

*Primary Examiner* — Wyatt P McConnell
(74) *Attorney, Agent, or Firm* — Lewis Roca Rothgerber Christie LLP

(57) ABSTRACT

A secondary battery includes a bare cell including a case and a cap plate sealing the case, a temperature sensing element on the cap plate, and a protective circuit module coupled to the cap plate and electrically connected to the bare cell and the temperature sensing element, wherein an electrical connection member is on at least one side of the temperature sensing element and electrically connects the temperature sensing element to at least one of the bare cell and/or the protective circuit module.

14 Claims, 4 Drawing Sheets

(56) References Cited

FOREIGN PATENT DOCUMENTS

JP          2004-127617  A     4/2004
KR     10-2007-0012937  A     1/2007

OTHER PUBLICATIONS

Screenshot of http://www.dictionary.com/browse/height obtained on May 29, 2018 published in 2018.*
EPO Search Report dated Jun. 14, 2016, for corresponding European Patent application 16158307.5, (7 pages).
Abstract and Machine English Translation of JP 2003-51304 A, Feb. 21, 2003, 25 Pages.
Abstract and Machine English Translation of JP 2004-127617 A, Apr. 22, 2004, 13 Pages.

* cited by examiner

SECONDARY BATTERY

CROSS-REFERENCE TO RELATED APPLICATION

This application claims priority to and the benefit of Korean Patent Application No. 10-2015-0029079 filed on Mar. 2, 2015 in the Korean Intellectual Property Office, with all the benefits accruing therefrom under 35 U.S.C. § 119, the contents of which are herein incorporated by reference in their entirety.

BACKGROUND

1. Field

Embodiments of the present invention relate to a secondary battery having a structurally and electrically stable configuration while having a simplified fabrication process.

2. Description of the Related Art

During charging and/or discharging of a secondary battery, over-charge or over-discharge may occur. The over-charge and/or the over-discharge may cause generation of gases due to decomposition of an electrolyte or generation of heat, thereby resulting in deterioration of battery performance or damage to the battery. Therefore, in order to reduce or prevent the occurrence of the over-charge or the over-discharge, the secondary battery includes a protective circuit module. The protective circuit module may cut off the charging or discharging when sufficient charging or discharging of the secondary battery is detected.

In addition, in order to prevent the secondary battery from being damaged due to heat generation, the secondary battery includes a positive temperature coefficient (PTC). The PTC senses heat generated from a bare cell and cuts off the flow of current of the bare cell when a temperature of the bare cell exceeds a certain (e.g., predetermined) level or when over-current flows through the bare cell.

The PTC is generally configured such that it is coupled to a top surface of the bare cell. In order to ensure stable charge and discharge operations of the bare cell, the PTC should be stably coupled to the bare cell.

SUMMARY

Embodiments of the present invention provide a secondary battery having a structurally and electrically stable configuration while having a simplified fabrication process.

The above and other aspects of embodiments of the present invention will be described in or will be apparent from the following description of exemplary embodiments of the present invention.

According to an embodiment of the present invention, there is provided a secondary battery including a bare cell including a case and a cap plate sealing the case, a temperature sensing element on the cap plate, and a protective circuit module coupled to the cap plate and electrically connected to the bare cell and the temperature sensing element, wherein an electrical connection member is on at least one side of the temperature sensing element and electrically connects the temperature sensing element to at least one of the bare cell and the protective circuit module.

The electrical connection member may be arranged between the cap plate and the temperature sensing element.

In addition, the electrical connection member may have a height corresponding to that of an electrode terminal protruding from the cap plate.

Further, the electrical connection member may include a first pad exposed to be coupled to the electrode terminal protruding from the cap plate, and a second pad exposed to be coupled to the temperature sensing element.

A surface of the electrical connection member configured to contact the cap plate may be insulated.

The electrical connection member may further include a connection member including a metal plate connecting the first pad and the electrode terminal to each other.

The connection member may include nickel or a nickel alloy.

The electrical connection member may further include a connection member include a metal plate connecting the temperature sensing element and the protective circuit module to each other.

The connection member may be integrally formed with the temperature sensing element.

The electrical connection member may be arranged between the temperature sensing element and the protective circuit module.

In addition, the electrical connection member may include a pad exposed to be coupled to the temperature sensing element and the protective circuit module.

A portion of the electrical connection member other than the pad may be electrically insulated.

The temperature sensing element may be a positive temperature coefficient (PTC).

The electrical connection member may include a printed circuit board.

As described above, in the secondary battery according to an embodiment of the present invention, a first connection member including (e.g., being) a printed circuit board is formed on a bottom surface of the temperature sensing element to correct a step difference of an electrode terminal in mounting a temperature sensing element on a cap plate of a bare cell, thereby providing the secondary battery with a more structurally and electrically stable structure and simplifying the fabricating process.

In addition, because the first connection member is formed based on an insulating substrate, the temperature sensing element connected to the electrode terminal is insulated from the cap plate, thereby providing electrical stability.

Further, the secondary battery according to embodiments of the present invention includes a second connection member as a printed circuit board formed between the temperature sensing element and a protective circuit module, thereby providing a degree of freedom in designing a pattern of the protective circuit module and reducing the fabrication cost by replacing a metal plate that is generally used in connecting a temperature sensing element with a protective circuit module.

BRIEF DESCRIPTION OF THE DRAWINGS

The above and other aspects of embodiments of the present invention will become more apparent by describing in detail exemplary embodiments thereof with reference to the attached drawings in which.

DETAILED DESCRIPTION

Figure 1:
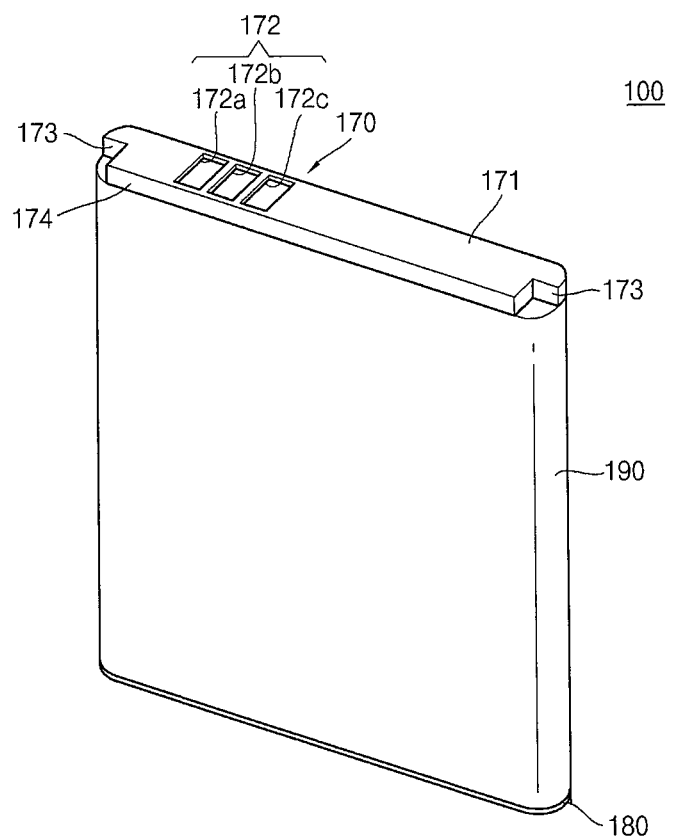
FIG. 1 is a perspective view of a secondary battery according to an embodiment of the present invention.

Hereinafter, exemplary embodiments of the present invention will be described in detail with reference to the accompanying drawings such that they can easily be made and used by those skilled in the art.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention". Expressions, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

The terminology used herein is for the purpose of describing particular example embodiments and is not intended to be limiting of example embodiments. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
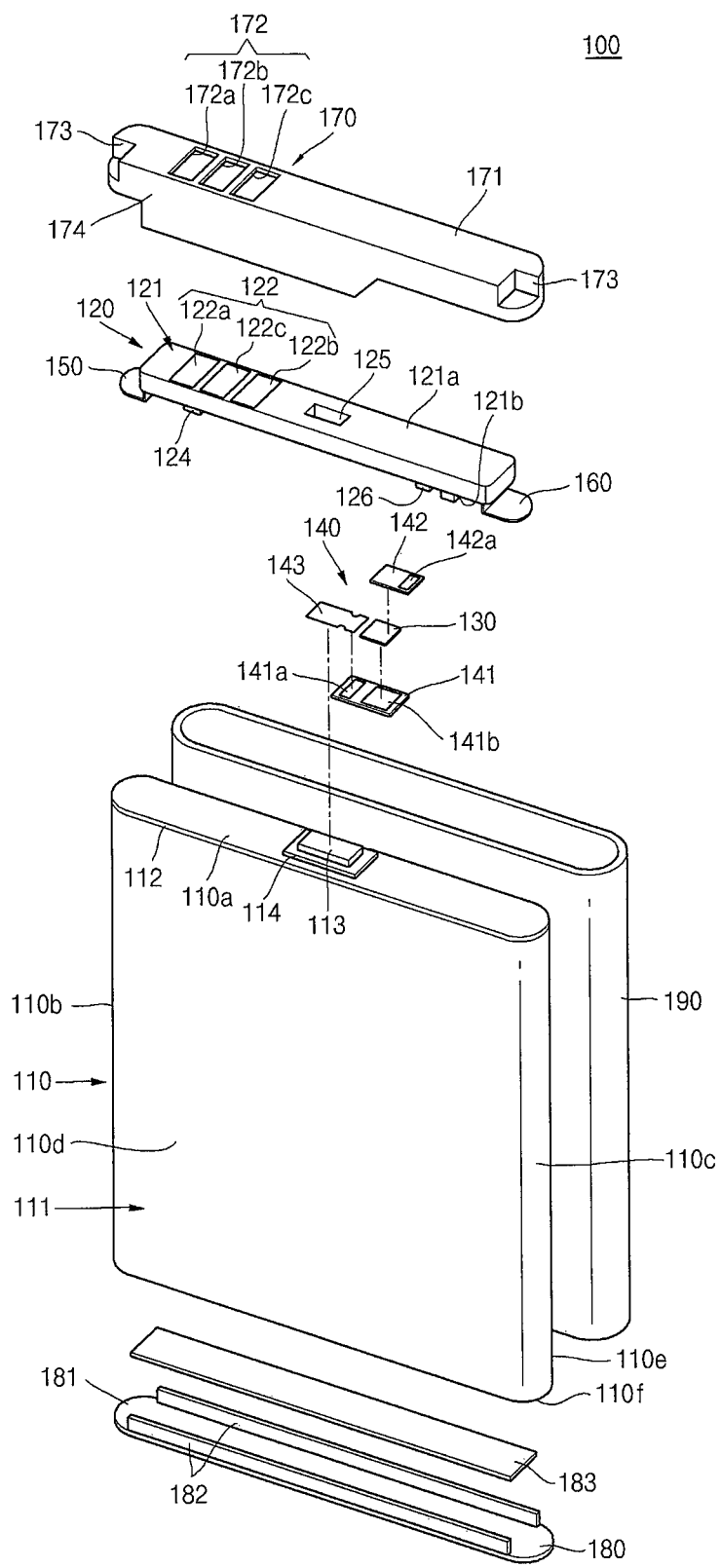
FIG. 2 is an exploded perspective view of the secondary battery shown in FIG. 1.
Figure 3:
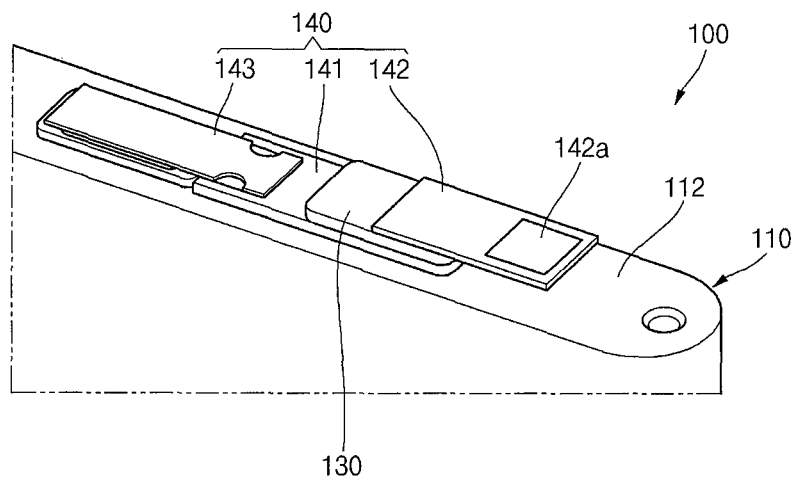
FIG. 3 is a perspective view illustrating a state in which a bare cell and a positive temperature coefficient (PTC) are coupled to each other in the secondary battery shown in FIG. 1.
Figure 4:
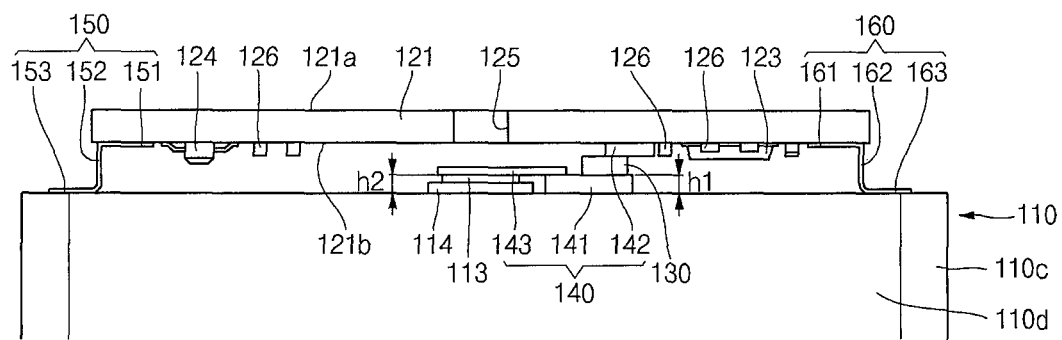
FIG. 4 is a side view illustrating a state in which a bare cell and a protective circuit module are coupled to each other in the secondary battery shown in FIG. 1.
Figure 5:
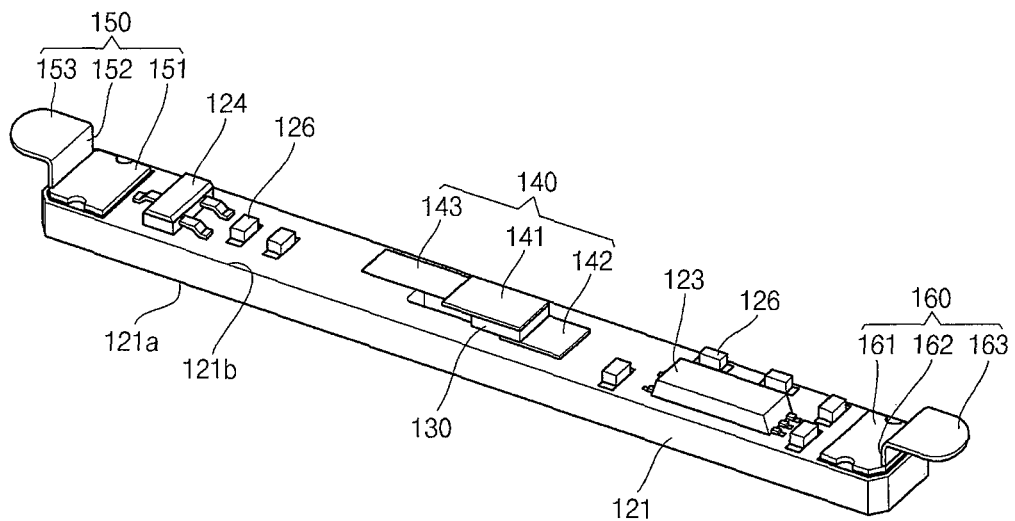
FIG. 5 is a bottom perspective view illustrating a state in which a positive temperature coefficient (PTC) and a protective circuit module are coupled to each other in the secondary battery shown in FIG. 1.

FIG. 1 is a perspective view of a secondary battery according to an embodiment of the present invention, FIG. 2 is an exploded perspective view of the secondary battery shown in FIG. 1, FIG. 3 is a perspective view illustrating a state in which a bare cell and a positive temperature coefficient (PTC) are coupled to each other in the secondary battery shown in FIG. 1, FIG. 4 is a side view illustrating a state in which a bare cell and a protective circuit module are coupled to each other in the secondary battery shown in FIG. 1, and FIG. 5 is a bottom perspective view illustrating a state in which a positive temperature coefficient (PTC) and a protective circuit module are coupled to each other in the secondary battery shown in FIG. 1.

Referring to FIGS. 1 and 2, the secondary battery 100 according to an embodiment of the present invention includes a bare cell 110, a protective circuit module 120, a positive temperature coefficient (PTC) 130, an electrical connection member 140, a first lead plate 150, and a second lead plate 160. In addition, the secondary battery 100 according to an embodiment of the present invention may further include an upper cover 170, a lower cover 180, and a label 190.

The bare cell 110 is capable of charging and discharging (e.g., is configured to be charged and discharged) and may include an electrode assembly including a positive electrode, a negative electrode, and a separator interposed between the positive electrode and the negative electrode, a can 111 made of a metallic material and having a container shape to receive the electrode assembly and an electrolyte, and a cap plate 112 sealing the can 111. In one embodiment, the cap plate 112 is made of a metallic material and an electrode terminal 113 is coupled to a roughly central area of the cap plate 112. In one embodiment, an insulation gasket 114 insulating the electrode terminal 113 from the cap plate 112 may be interposed between the cap plate 112 and the electrode terminal 113.

The can 111 and the cap plate 112 may serve as terminals. In one embodiment, the can 111 and the cap plate 112 may serve as a positive electrode. In this embodiment, electrode terminal 113 serves as a negative electrode. Thus, in one embodiment, the cap plate 112 and the electrode terminal 113 may have opposite polarities.

In a state in which the electrode terminal 113 is insulated from the bare cell 110 by the gasket 114, the bare cell 110 has a top surface 110a from which the electrode terminal 113 protrudes, a pair of short side surfaces 110b and 110c and a pair of long side surfaces 110d and 110e connected to the top surface 110a, and a bottom surface 110f connected to the side surfaces 110b, 110c, 110d, and 110e and facing the top surface 110a. In one embodiment, the pair of short side surfaces 110b and 110c are relatively narrow-width side surfaces among the side surfaces 110b, 110c, 110d, and 110e connected to the top surface 110a of the bare cell 110, and the pair of long side surfaces 110d and 110e are relatively wide-width side surfaces among the side surfaces 110b, 110c, 110d, and 110e of the bare cell 110.

The protective circuit module 120 is disposed on the bare cell 110 to be electrically connected to the bare cell 110 and includes a circuit board 121, a terminal 122, a circuit device 123, a field effect transistor (FET) 124, and a welding opening 125 (e.g., a welding hole).

The circuit board 121 is substantially plate-shaped and includes a protection circuit for preventing over-charge, over-discharge, and/or over-current from being caused to the bare cell 110. In one embodiment, a top surface 121a of the circuit board 121 is defined to be the same as (e.g., is the same as) a top surface of the protective circuit module 120 and a bottom surface 121b of the circuit board 121 is defined to be (e.g., is) the same as a bottom surface of the protective circuit module 120.

The terminal 122 is formed on the top surface 121a of the circuit board 121 and electrically connects the circuit board 121 to an external electric device. In one embodiment, the terminal 122 may include a pack minus terminal 122a, a pack plus terminal 122b, and a temperature identifying (ID) terminal 122c.

The circuit device 123 is formed on (e.g., attached to) the bottom surface 121b of the circuit board 121. The circuit device 123 constitutes (e.g., is) a charge/discharge circuit for performing charging and discharging operations of the bare cell 110. In addition, the circuit device 123 constitutes a protection circuit for preventing the over-charge, over-discharge, and/or over-current from being caused to the bare cell 110.

The FET 124 is formed on (e.g., attached to) the bottom surface 121b of the circuit board 121. The FET 124 is electrically connected to the circuit device 123 through the circuit board 121. The FET 124 is a portion of the charge/discharge circuit of the circuit device 123. The FET 124 is positioned along at least a portion of a charge path or a discharge path of the bare cell 110 and controls the charging or discharging operation. Because heat is generated during the operation of the FET 124, the FET 124 may be separately provided outside the circuit device 123. However, depending on the circuit design, the FET 124 may also be incorporated into the circuit device 123.

The welding opening 125 is positioned at a roughly central region of the circuit board 121 and is formed to pass through the top surface 121a and the bottom surface 121b. The welding opening 125 is positioned at a region corresponding to the electrode terminal 113 of the bare cell 110 and provides a welding space when the electrical connection member 140, to be further described later, is welded to the electrode terminal 113 by resistance welding or laser welding.

A passive device 126 may be a portion of the charge/discharge circuit of the circuit device 123. The passive device 126 may also be provided as a separate component. However, in another embodiment, the passive device 126 may be incorporated into (e.g., may be integral with) the circuit device 123.

The temperature sensing element 130 is installed on the bottom surface 121b of the circuit board 121 to be electrically connected to the pattern of the protective circuit module 120. The temperature sensing element 130 cuts off the flow of current when a temperature of the bare cell 110 exceeds a reference temperature, thereby preventing an abnormal operation of the bare cell 110 due to the heat generated from the bare cell 110. To this end, the temperature sensing element 130 may be provided as a positive temperature coefficient (PTC). In addition, the temperature sensing element 130 may be a chip PTC thermistor that is surface-mountable on the circuit board 121, but the kind of the temperature sensing element 130 is not limited thereto. For example, the temperature sensing element 130 may have a room-temperature resistance of several hundreds of ohms and an operating temperature in a range of between 75° C. and 120° C.

Among surfaces of the temperature sensing element 130, a bottom surface facing the bare cell 110 is positioned over the cap plate 112 and on the electrical connection member 140 and is electrically connected to the electrode terminal 113. In addition, the temperature sensing element 130 may be coupled to the electrical connection member 140 by welding or soldering. In addition, the temperature sensing element 130 may also be coupled to the electrical connection member 140 through a thermally conductive adhesive.

The electrical connection member 140 includes a first connection member 141 formed between the cap plate 112 of the bare cell 110 and the temperature sensing element 130, a second connection member 142 formed between the temperature sensing element 130 and the protective circuit module 120, and a third connection member 143 formed between the first connection member 141 and the electrode terminal 113.

The first connection member 141 may be provided as a printed circuit board (PCB). Therefore, the first connection member 141 electrically separates an electrical path between the temperature sensing element 130 and the cap plate 112. Therefore, the first connection member 141 may increase a degree of design freedom by reducing a positional limitation of the temperature sensing element 130.

In addition, the first connection member 141 is formed such that a height h1 of the first connection member 141 corresponds to a height h2 of the electrode terminal 113 in view of (e.g., relative to) the cap plate 112. Therefore, the first connection member 141 corrects a step difference of the electrode terminal 113 (e.g., corrects a step difference between the electrode terminal 113 and the cap plate 112), thereby shortening a length of the third connection member 143 to be coupled to the temperature sensing element 130 and reducing the fabrication cost by simplifying a configuration of the third connection member 143. In addition, because the first connection member 141 is capable of reducing the length of a metal plate (e.g., a nickel plate) required for forming the third connection member 143, the fabrication cost can be reduced.

In addition, the first connection member 141 includes a first pad 141a coupled to the third connection member 143 and a second pad 141b coupled to the temperature sensing element 130. The first pad 141a and the second pad 141b may be configured to have a shape of a metal pattern exposed from a body of an insulating substrate. In addition, the first pad 141a and the second pad 141b are electrically connected to each other. Therefore, the third connection member 143 and the electrode terminal 113, coupled to the first pad 141a, are electrically connected to the temperature sensing element 130, coupled to the second pad 141b. Accordingly, because the current flowing from the electrode terminal 113 or flowing to the electrode terminal 113 passes (e.g., passes through) the temperature sensing element 130, the temperature sensing element 130 may control the current according to the temperature of the bare cell 110.

The second connection member 142 is formed between the temperature sensing element 130 and the protective circuit module 120. The second connection member 142 may also be formed as a PCB. The second connection member 142 includes a pad 142a formed on its top surface to be electrically connected to the protective circuit module 120 and a pad formed on its bottom surface to be electrically connected to the temperature sensing element 130. In addition, because the second connection member 142 is formed such that the pad 142a is positioned in a desired pattern, the degree of design freedom of the pattern of the protective circuit module 120 can be increased. Therefore, a positional limitation in arranging devices of the protective circuit module 120 can be reduced. In addition, because the second connection member 142 can replace (e.g., can be used in place of) the metal plate generally used in connecting the temperature sensing element 130 with the protective circuit module 120, the fabrication cost can be reduced.

The third connection member 143 electrically connects the temperature sensing element 130 to the electrode terminal 113. For example, the third connection member 143 connects the electrode terminal 113 to the first pad 141a of the first connection member 141, thereby connecting the temperature sensing element 130, coupled to the first pad 141a, to the electrode terminal 113. The third connection member 143 may be formed of a metal plate. Nickel or a nickel alloy may be used as a material of the metal plate.

The first lead plate 150 is formed at a lower portion of one side of the protective circuit module 120. The first lead plate 150 is electrically connected to a terminal pattern of the protective circuit module 120. The first lead plate 150 electrically connects the bare cell 110 to the protective circuit module 120. The first lead plate 150 may be made of a metallic material, for example, nickel or a nickel alloy. In one embodiment, the first lead plate 150 may be connected to the top surface 110a of the bare cell 110, for example, the cap plate 112, thereby functioning as a first electrode (e.g., a positive electrode). The first lead plate 150 has a first region 151 formed under the protective circuit module 120, a second region 152 bent (e.g., bent from) and connected to the first region 151, and a third region 153 bent from the second region 152 and coupled to the cap plate 112 of the bare cell 110.

The second lead plate 160, corresponding to (e.g., similar to) the first lead plate 150, is formed at a lower portion of the other side of the protective circuit module 120 (e.g., the other side of the protective circuit module 120 with respect to the side thereof at which the first lead plate 150 is formed). The second lead plate 160, shaped to be symmetrical to the first lead plate 150, is electrically connected to the terminal pattern of the protective circuit module 120. The second lead plate 160 includes a first region 161, a second region 162, and a third region 163 corresponding to the first to third regions 151 to 153 of the first lead plate 150.

The upper cover 170 is coupled to a top portion of the bare cell 110 and accommodates the protective circuit module 120 in its inner space. The upper cover 170 includes a cover plate 171 and sidewalls 173 and 174 extending from the cover plate 171 to or toward the protective circuit module 120.

The cover plate 171 may be formed to have substantially the same or the same configuration as the top surface 110a of the bare cell 110 (e.g., the cover plate 171 may have the same or substantially the same size and/or shape as the top surface 110a of the bare cell 110). AJKn inner surface of the cover plate 171 comes into contact with the top surface 121a of the circuit board 121. The cover plate 171 has a throughhole 172 located at a region corresponding to the terminal 122. The throughhole 172 includes three throughholes 172a, 172b, and 172c corresponding to the pack minus terminal 122a, the pack plus terminal 122b, and the temperature ID terminal 122c of the terminal 122 and exposes the terminal 122 to the outside, thereby permitting the secondary battery 100 according to an embodiment of the present invention to be electrically connected to the external electric device.

The sidewalls 173 and 174 include ending parts 173 positioned at opposite lengthwise ends of the upper cover 170 and a connection part 174 connecting the ending parts 173. The ending parts 173 come in contact with regions of the top surface 110a of the bare cell 110 corresponding to the short side surfaces 110b and 110c and support the cover plate 171. The connection part 174 extends downwardly toward the protective circuit module 120 further than the ending parts 173. A portion of the connection part 174 covering top portions of the long side surfaces 110d and 110e of the bare cell 110 is surrounded by a label 190 to be described later.

The lower cover 180 is coupled to a bottom portion of the bare cell 110. The lower cover 180 may include a bottom plate 181 and an extension part 182 extending from the bottom plate 181 to or toward the bare cell 110.

The bottom plate 181 has substantially the same configuration (e.g., substantially the same or the same size and/or shape) as the bottom surface 110f of the bare cell 110 and may be adhered to the bottom surface 110f of the bare cell 110 by an adhesion member 183.

The extension part 182 covers bottom portions of the long side surfaces 110d and 110e of the bare cell 110, and the extension part 182 is surrounded by the label 190, to be further described later.

The label 190 is attached to surround the side surfaces 110b, 110c, 110d and 110e of the bare cell 110. The label 190 covers a portion of the connecting part 174 of the upper cover 170 and the extension part 182 of the lower cover 180.

As described above, in the secondary battery 100 according to an embodiment of the present invention, the first connection member 141 provided as a PCB is formed on the bottom surface of the temperature sensing element 130, thereby correcting a step difference between the electrode terminal 113 and the temperature sensing element 130 on the cap plate 112 of the bare cell 110. Accordingly, the secondary battery 100 can provide a more structurally and electrically stable structure and simplify the fabricating process thereof. In addition, because the first connection member 141 is formed based on an insulating substrate, the temperature sensing element 130 connected to the electrode terminal 113 is insulated from the cap plate 112, thereby providing electrical stability.

In addition, in the secondary battery 100 according to an embodiment of the present invention, the second connection member 142 provided as a PCB is formed between the temperature sensing element 130 and the protective circuit module 120, thereby additionally providing a degree of freedom in designing a pattern of the protective circuit module 120. Further, the second connection member 142 can replace a generally used metal plate, thereby reducing the fabrication cost.

Hereinafter, a configuration of a secondary battery according to another embodiment of the present invention will be described.

Figure 6:
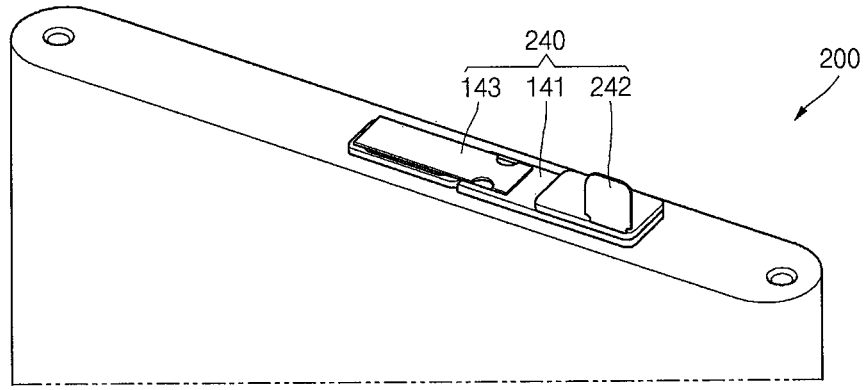
FIG. 6 is a perspective view illustrating a state in which a bare cell and a positive temperature coefficient (PTC) are coupled to each other in a secondary battery according to an embodiment of the present invention.
Figure 7:
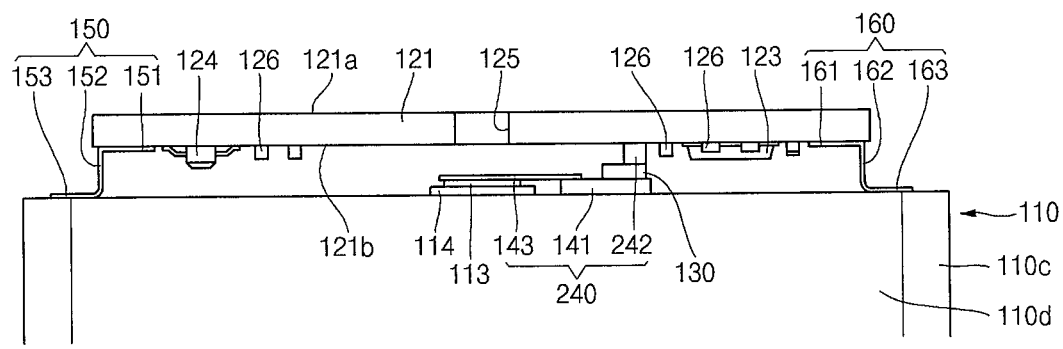
FIG. 7 is a side view illustrating a state in which the bare cell and a protective circuit module are coupled to each other in the secondary battery shown in FIG. 6.
Figure 8:
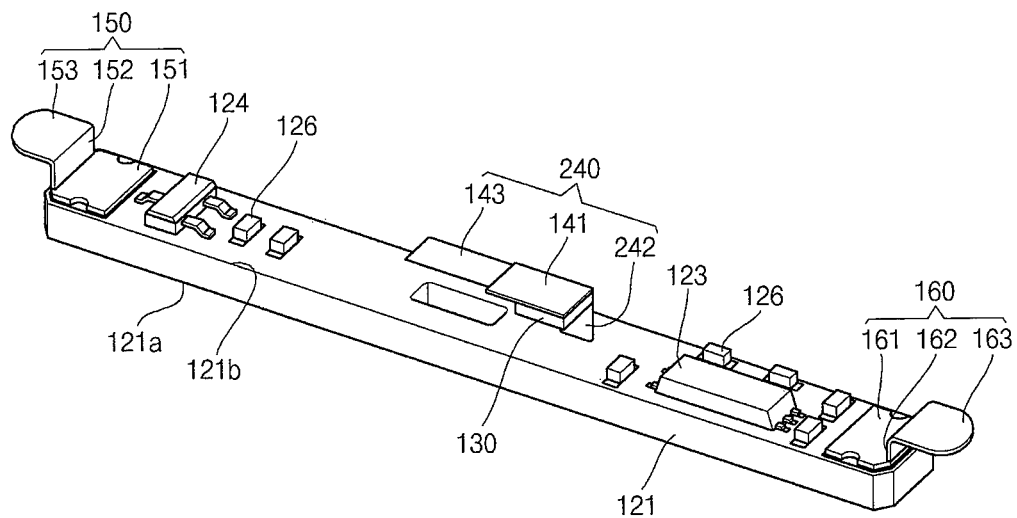
FIG. 8 is a bottom perspective view illustrating a state in which the positive temperature coefficient (PTC) and the protective circuit module are coupled to each other in the secondary battery shown in FIG. 6.

FIG. 6 is a perspective view illustrating a state in which a bare cell and a positive temperature coefficient (PTC) are coupled to each other in a secondary battery according to another embodiment of the present invention, FIG. 7 is a side view illustrating a state in which the bare cell and a protective circuit module are coupled to each other in the secondary battery shown in FIG. 6, and FIG. 8 is a bottom perspective view illustrating a state in which the positive temperature coefficient (PTC) and the protective circuit module are coupled to each other in the secondary battery shown in FIG. 6.

Referring to FIGS. 6 to 8, the secondary battery 200 according to another embodiment of the present invention includes a bare cell 110, a protective circuit module 120, a temperature sensing element 130, an electrical connection member 240, a first lead plate 150, and a second lead plate 160. The secondary battery 200 according to another embodiment of the present invention may further include the upper cover 170, a lower cover 180, and a label 190. The same elements as those of the previously-described embodiment are denoted by the same reference numerals and the following description will primarily focus on differences between the present and previously-described embodiments.

The electrical connection member 240 includes a first connection member 141 formed between a cap plate 112 of the bare cell 110 and the temperature sensing element 130, a second connection member 242 formed between the temperature sensing element 130 and the protective circuit module 120, and a third connection member 143 formed between the first connection member 141 and an electrode terminal 113. In this embodiment, because configurations of the first connection member 141 and the third connection member 143 are substantially the same or the same as those of the previously-described embodiment, repeated descriptions thereof may not be given.

The second connection member 242 is formed between the temperature sensing element 130 and the protective circuit module 120. The second connection member 242 is formed of a metal plate and may be directly coupled to a bottom surface 121*b* of the protective circuit module 120. The second connection member 242 may be implemented by a lead tab provided in the temperature sensing element 130 without changing a configuration of a general temperature sensing element 130. The second connection member 242 may be made of nickel or a nickel alloy, for example.

The third connection member 143 electrically connects the temperature sensing element 130 to an electrode terminal 113. For example, the third connection member 143 connects the electrode terminal 113 to a first pad 141*a* of the first connection member 141, thereby connecting the temperature sensing element 130, coupled to the first pad 141*a*, to the electrode terminal 113. The third connection member 143 may be formed of a metal plate. Nickel or a nickel alloy may be used as a material of the metal plate.

While the secondary battery of the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A secondary battery comprising:
    a bare cell comprising a case and a cap plate sealing the case;
    a temperature sensing element on the cap plate; and
    a protective circuit module coupled to the cap plate and electrically connected to the bare cell and the temperature sensing element; and
    an electrical connection member comprising:
        a first electrical connection member between the temperature sensing element and the cap plate and electrically connecting the temperature sensing element to at least one of the bare cell and the protective circuit module; and
        a second connection member connecting an electrode terminal protruding from the cap plate and the first electrical connection member to each other,
    wherein a thickness of a portion of the first electrical connection member on which the temperature sensing element is arranged corresponds to a height of the electrode terminal above the cap plate.

2. The secondary battery of claim 1, wherein the first electrical connection member comprises:
    a first pad exposed to be coupled to the electrode terminal protruding from the cap plate; and
    a second pad exposed to be coupled to the temperature sensing element.

3. The secondary battery of claim 2, wherein a surface of the electrical connection member configured to contact the cap plate is insulated.

4. The secondary battery of claim 2, wherein the second connection member comprises a metal plate connecting the first pad and the electrode terminal to each other.

5. The secondary battery of claim 4, wherein the second connection member comprises nickel or a nickel alloy.

6. The secondary battery of claim 1, further comprising a third connection member comprising a metal plate connecting the temperature sensing element and the protective circuit module to each other.

7. The secondary battery of claim 6, wherein the third connection member is integrally formed with the temperature sensing element.

8. The secondary battery of claim 1, wherein the temperature sensing element is a positive temperature coefficient.

9. The secondary battery of claim 1, wherein the first electrical connection member comprises a printed circuit board.

10. The secondary battery of claim 9, wherein the printed circuit board comprises a first pad and a second pad,
    wherein the first and second pads are both arranged on an upper surface of the printed circuit board facing the protective circuit module, and
    wherein the first pad is coupled to the electrode terminal protruding from the cap plate, and the second pad is coupled to the temperature sensing element.

11. The secondary battery of claim 1, further comprising a third connection member, the third connection member comprising a first printed circuit board connecting the temperature sensing element and the protective circuit module to each other.

12. The secondary battery of claim 11, wherein the first electrical connection member comprises a second printed circuit board.

13. The secondary battery of claim 1, wherein a distance between a lower surface of the temperature sensing element and the cap plate corresponds to the height of the electrode terminal above the cap plate.

14. The secondary battery of claim 1, wherein a proximal end of the second connection member is welded to the electrode terminal, and a distal end of the second connection member is connected to an upper surface of the first electrical connection member.

\* \* \* \* \*